US008036480B2

(12) United States Patent
Yano

(10) Patent No.: US 8,036,480 B2
(45) Date of Patent: Oct. 11, 2011

(54) IMAGE PROCESSING SYSTEM

(75) Inventor: Takahiro Yano, Hachioji (JP)

(73) Assignee: Olympus Corporation (JP)

( * ) Notice: Subject to any disclaimer, the term of this patent is extended or adjusted under 35 U.S.C. 154(b) by 621 days.

(21) Appl. No.: 12/233,642

(22) Filed: Sep. 19, 2008

(65) Prior Publication Data

US 2009/0016632 A1 Jan. 15, 2009

Related U.S. Application Data

(63) Continuation of application No. PCT/JP2007/055563, filed on Mar. 19, 2007.

(30) Foreign Application Priority Data

Apr. 4, 2006 (JP) ................................ 2006-103634

(51) Int. Cl.
*G06K 9/40* (2006.01)

(52) U.S. Cl. ........ 382/254; 382/260; 382/274; 382/275; 358/3.26; 358/3.27; 358/463

(58) Field of Classification Search .................. 382/260, 382/274, 275; 358/3.26, 3.27, 463
See application file for complete search history.

(56) References Cited

U.S. PATENT DOCUMENTS

| | | | | |
|---|---|---|---|---|
| 7,202,895 | B2 * | 4/2007 | Hirai | 348/272 |
| 7,317,559 | B2 * | 1/2008 | Kobayashi | 358/474 |
| 7,353,994 | B2 * | 4/2008 | Farrall et al. | 235/454 |
| 7,364,906 | B2 * | 4/2008 | Pankowsky | 436/10 |
| 7,513,952 | B2 * | 4/2009 | Mestha et al. | 118/712 |

FOREIGN PATENT DOCUMENTS

| | | |
|---|---|---|
| JP | 2004-180284 | 6/2004 |
| JP | 2004-312140 | 11/2004 |
| JP | 2005-107252 | 4/2005 |
| JP | 2005-109968 | 4/2005 |
| JP | 2005-117192 | 4/2005 |
| JP | 2006-67214 | 3/2006 |

OTHER PUBLICATIONS

International Search Report mailed Jul. 3, 2007 in corresponding PCT International Application No. PCT/JP2007/055563.
H.J. Trussell et al., "Mathematics for Demosaicking," IEEE Transactions on Image Processing, vol. 11, No. 4, Apr. 2002, pp. 485-492.
Ikuko Ota et al., "A Pixel Mixture and Restoration Method Using an Iterative Method," Symposium on Sensing via Image Information, B-8, Jun. 12-13, 2003, pp. 75-78.

* cited by examiner

*Primary Examiner* — Yosef Kassa
(74) *Attorney, Agent, or Firm* — Ostrolenk Faber LLP

(57) ABSTRACT

An image processing system for restoring a resolution of a pixel-mixed image represented by a mixed-pixel signal which is acquired when a plurality of pixel signals in an image pickup device are mixed and are read out includes a shooting situation acquiring section, a restoration matrix generating section, and a restoration processing section. The shooting situation acquiring section acquires a shooting situation when the mixed-pixel signal is acquired. The restoration matrix generating section generates a pixel mixture restoration matrix based on the shooting situation acquired by the shooting situation acquiring section. The restoration processing section restores a resolution of the pixel-mixed image using the mixed-pixel signal and the pixel mixture restoration matrix.

15 Claims, 6 Drawing Sheets

FIG.2

| | | | | | |
|---|---|---|---|---|---|
| R | Gr | R | Gr | R | Gr |
| Gb | B | Gb | B | Gb | B |
| R | Gr | R | Gr | R | Gr |
| Gb | B | Gb | B | Gb | B |
| R | Gr | R | Gr | R | Gr |
| Gb | B | Gb | B | Gb | B |

FIG.3

| | | | | | |
|---|---|---|---|---|---|
| Cy | Ye | Cy | Ye | Cy | Ye |
| G | Mg | G | Mg | G | Mg |
| Cy | Ye | Cy | Ye | Cy | Ye |
| G | Mg | G | Mg | G | Mg |
| Cy | Ye | Cy | Ye | Cy | Ye |
| G | Mg | G | Mg | G | Mg |

IMAGE PROCESSING SYSTEM

CROSS REFERENCE TO RELATED APPLICATION

This application is a continuation application of PCT/JP2007/055563 filed on Mar. 19, 2007 and claims benefit of Japanese Application No. 2006-103634 filed in Japan on Apr. 4, 2006, the entire contents of which are incorporated herein by this reference.

BACKGROUND OF INVENTION

1. Field of the Invention

The present invention relates to an image processing technique for a pixel-mixed image which has undergone pixel mixture processing and, more particularly, to an image processing system for restoring a resolution of a pixel-mixed image deteriorated by pixel mixture processing at high speed with high precision.

2. Description of the Related Art

Owing to recent development of semiconductor technology, there has been a trend toward higher-resolution image pickup devices.

Although efforts to obtain devices with smaller sizes and higher speeds have been made, it takes much time to read out data from a multi-pixel image pickup device. Also, high-speed readout involves the problem of heat generation and is regarded as difficult to be realized.

Pixel mixture techniques recently have been developed and widely known (Japanese Patent Application Laid-Open Publication No. 2004-180284, Japanese Patent Application Laid-Open Publication No. 2004-312140, Japanese Patent Application Laid-Open Publication No. 2005-107252, Japanese Patent Application Laid-Open Publication No. 2005-109968, and Japanese Patent Application Laid-Open Publication No. 2005-117192). A pixel mixture technique is a technique for mixing a plurality of pixels on an image pickup device and reading out the plurality of pixels as one pixel. Simultaneous readout of a plurality of pixels allows high-speed data readout. Readout of a plurality of pixels after mixture increases a speed at which an image pickup signal is read out but causes less aliasing than simple thinning readout. This significantly improves a per-pixel S/N ratio.

As a Bayer pattern demosaicking method, a method has recently been proposed for obtaining a demosaicking result optimum in terms of least squares without using a repetitive operation (H. J Trussel and Robert E. Hartwing, "Mathematics for Demosaicking", IEEE Trans. Image Processing, Vol. 11, No. 4, April 2002).

A pixel mixture technique, however, four-pixel mixture processing reduces a resolution to one-fourth, and nine-pixel mixture processing reduces a resolution to one-ninth.

As a method for restoring a resolution deteriorated by the pixel mixture processing, an image restoration method is proposed for performing restoration processing by minimizing energy between images before and after restoration ("Restoration from Pixel Mixture Using Iterative Method", Symposium on Sensing via Image Information, B-8, pp. 75-78, Jun. 12-13, 2003).

However, since an image restoration method by "Restoration from Pixel Mixture Using Iterative Method" uses a repetitive operation for restoration processing, the method requires a large amount of calculation and much processing time. Accordingly, there is a need for obtaining a solution at high speed without performing a repetitive operation as in a conventional method when performing restoration processing on a pixel-mixed image.

SUMMARY OF THE INVENTION

According to the present invention, an image processing system for restoring a resolution of a pixel-mixed image represented by a mixed-pixel signal which is acquired when a plurality of pixel signals in an image pickup device are mixed and are read out, includes: a shooting situation acquiring section for acquiring a shooting situation when the mixed-pixel signal is acquired, a restoration matrix generating section for generating a pixel mixture restoration matrix based on the shooting situation acquired by the shooting situation acquiring section, and a restoration processing section for restoring the resolution of the pixel-mixed image using the mixed-pixel signal and the pixel mixture restoration matrix.

BRIEF DESCRIPTION OF THE DRAWINGS

FIG. 2 is a diagram showing a configuration of a Bayer primary color filter;

FIG. 3 is a diagram showing a color difference filter;

DETAILED DESCRIPTION OF THE PREFERRED EMBODIMENT(S)

Embodiments of the present invention will be described with reference to the drawings.

First Embodiment

Figure 1:
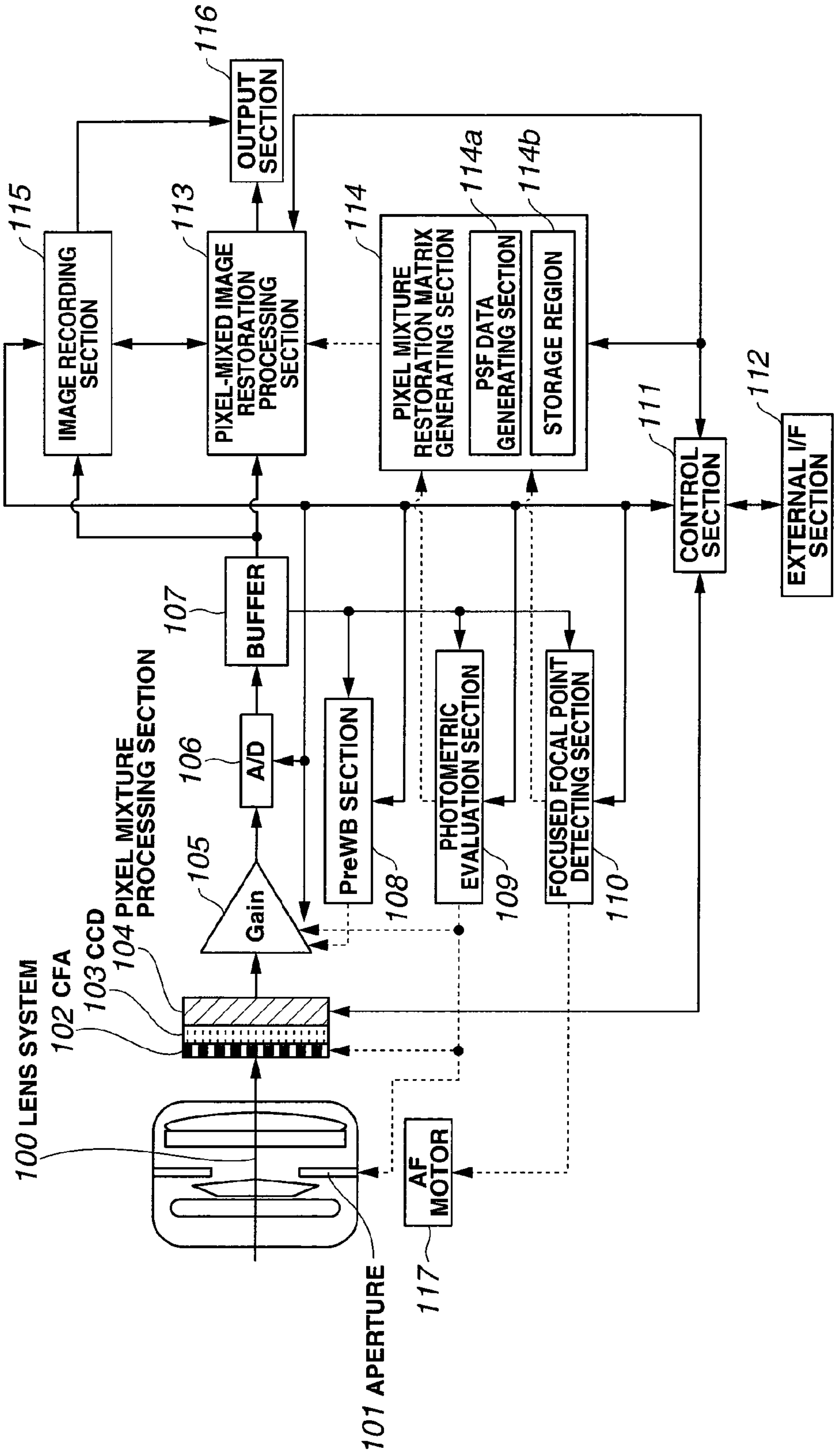
FIG. 1 is a configuration diagram of an image processing system according to a first embodiment of the present invention.
Figure 4:
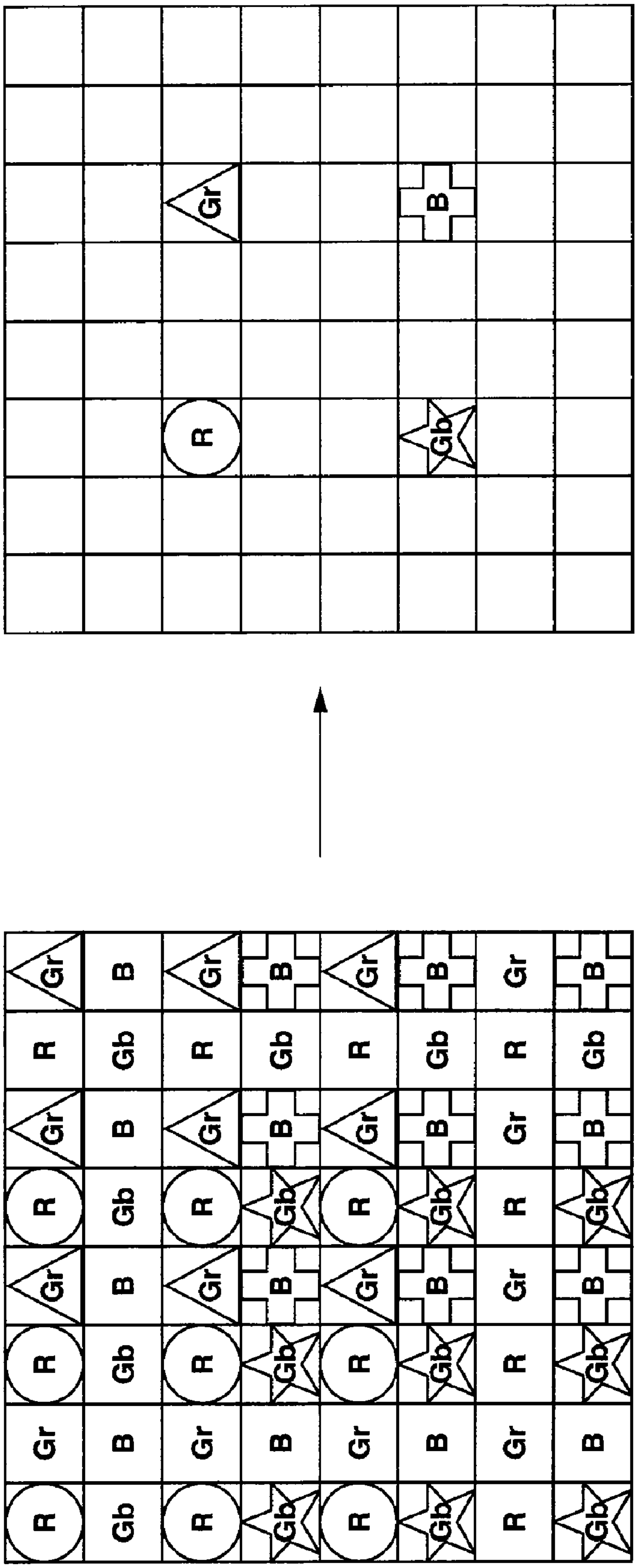
FIG. 4 is a conceptual diagram of nine-pixel mixture processing.
Figure 5:
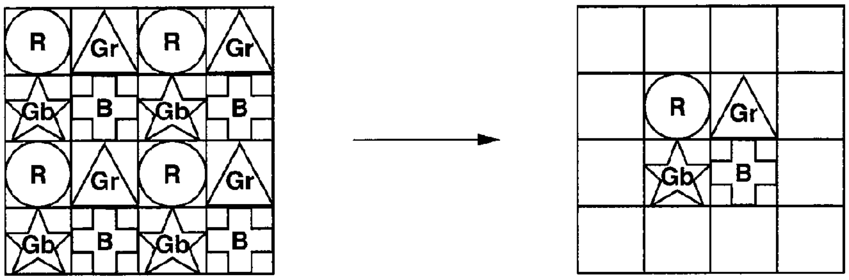
FIG. 5 is a conceptual diagram of four-pixel mixture processing.
Figure 6:
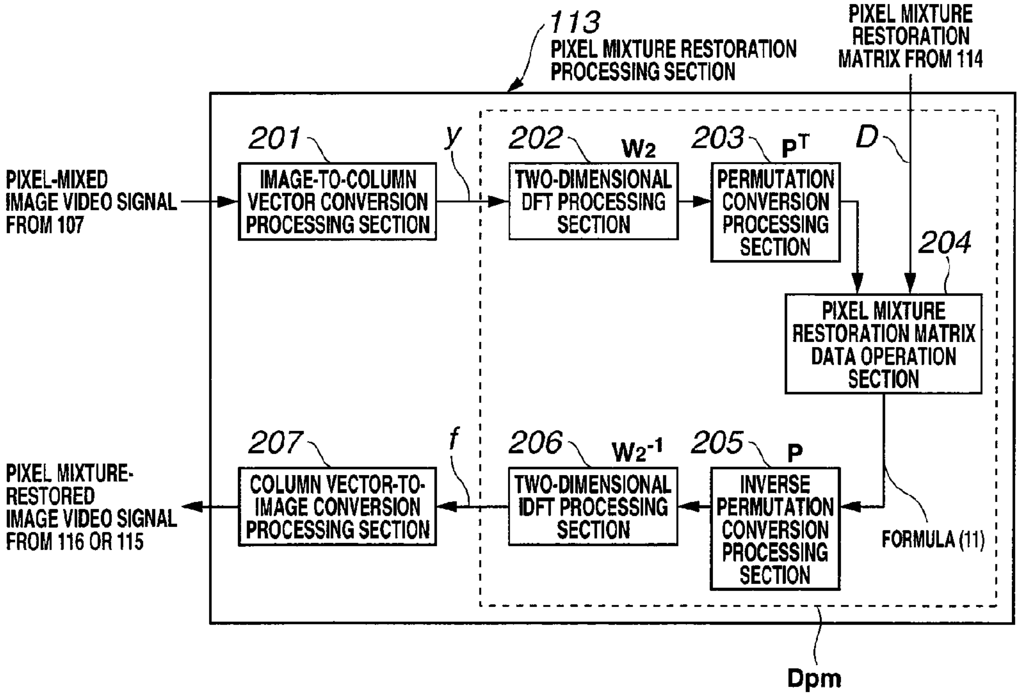
FIG. 6 is a block diagram showing a configuration of a pixel-mixed image restoration processing section in FIG. 1.
Figure 7:
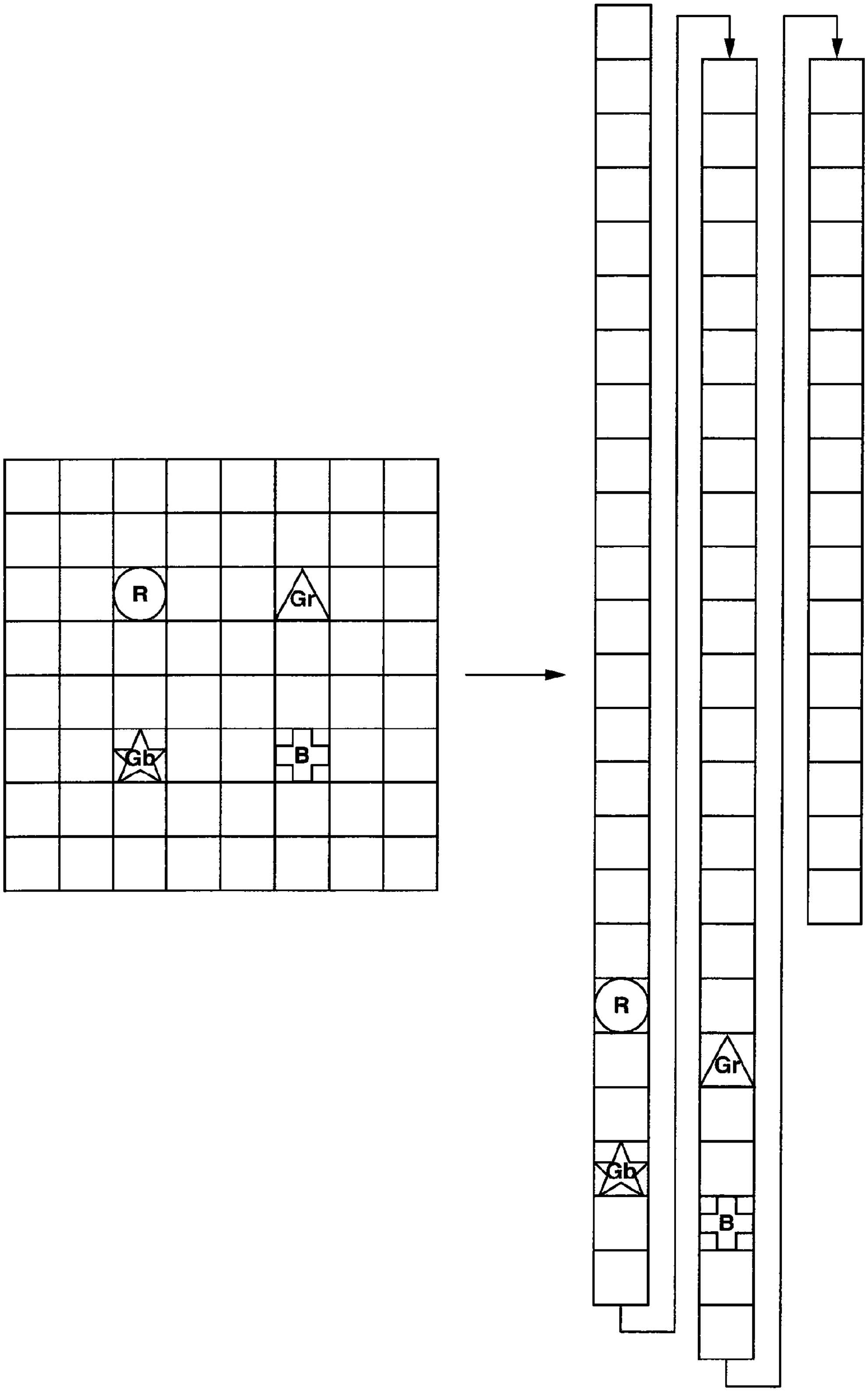
FIG. 7 is a conceptual diagram of image-to-column vector conversion processing.

FIGS. 1 to 7 relate to an image processing system according to a first embodiment of the present invention. FIG. 1 is a configuration diagram of the image processing system according to the first embodiment of the present invention. FIG. 2 is a diagram showing a configuration of a Bayer primary color filter. FIG. 3 is a diagram showing a color difference filter. FIG. 4 is a conceptual diagram of nine-pixel mixture processing. FIG. 5 is a conceptual diagram of four-pixel mixture processing. FIG. 6 is a block diagram showing a configuration of a pixel-mixed image restoration processing section in FIG. 1. FIG. 7 is a conceptual diagram of image-to-column vector conversion processing.

In the image processing system shown in FIG. 1, a CCD 103 serving as an image pickup device receives an incident optical image of a subject, photoelectrically converts the optical image, and outputs a result of the photoelectric conversion as image pickup signals. An image pickup signal obtained through shooting via a lens system 100, an aperture 101, and the CCD 103 constituting an image pickup section is amplified by a gain control amplifier (hereinafter abbreviated as a Gain) 105 and is converted into a digital signal by an A/D converter (hereinafter abbreviated as an A/D) 106.

A Color Filter Array (hereinafter abbreviated as a CFA) 102 is provided at a front of the CCD 103. A pixel mixture processing section 104 serving as a pixel mixture section for subjecting pixels as analog signals obtained through shooting by the CCD to mixture processing and reading out the pixels is connected to the CCD 103.

A signal from the A/D 106 is transferred to an image recording section 115 or a pixel-mixed image restoration processing section 113 serving as a restoration processing section through a buffer 107. The buffer 107 is also connected to a PreWB section 108, a photometric evaluation section 109, and a focused focal point detecting section 110.

The PreWB section 108 is connected to the Gain 105. The photometric evaluation section 109 is connected to the aperture 101, the CCD 103, the Gain 105, and a pixel mixture restoration matrix generating section 114 serving as a restoration matrix generating section. The focused focal point detecting section 110 is connected to an AF motor 117 and the pixel mixture restoration matrix generating section 114.

The pixel mixture restoration matrix generating section 114 is connected to a pixel-mixed image restoration processing section 113. The image recording section 115 is connected to the pixel-mixed image restoration processing section 113 and an output section 116. The pixel-mixed image restoration processing section 113 is connected to the image recording section 115 and the output section 116. Data supplied from the pixel-mixed image restoration processing section 113 to the image recording section 115 and the output section 116 is a restored full-color image (to be described later).

A control section 111 such as a microcomputer is bi-directionally connected to the Gain 105, the A/D 106, the PreWB section 108, the photometric evaluation section 109, the focused focal point detecting section 110, the pixel mixture processing section 104, the pixel-mixed image restoration processing section 113, the pixel mixture restoration matrix generating section 114, and the image recording section 115.

An external I/F section 112 which includes a power switch, a shutter button, and an interface for switching among various modes at the time of shooting is also bi-directionally connected to the control section 111.

Functions and operation of the sections in FIG. 1 will be described below.

With respect to mosaic image pickup signals obtained through image pickup by the single plate CCD 103, which is an image pickup device with the CFA 102 provided at the front, a plurality of pixel signals are mixed and are read out at high speed by the pixel mixture processing section 104 serving as the pixel mixture section after the image pickup. After that, the pixel-mixed image restoration processing section 113 serving as the restoration processing section performs restoration processing on a pixel-mixed image, thereby increasing a resolution (i.e., the number of pixels) of the pixel-mixed image and fully colorizing the pixel-mixed image. The pixel-mixed image is outputted to the output section 116 or the image recording section 115.

The term full colorization originally refers to a process of interpolatively generating, for each color pixel (e.g., R) obtained from an image pickup device via, e.g., a Bayer pattern filter, the other two color pixels (e.g., G and B) from pixels surrounding the R pixel and thereby tripling the number of pixels of Bayer pixels actually obtained through light reception and image pickup. The term is synonymous with demosaicking, which generates full-color pixels from Bayer pixels.

The present application characteristically generates an image with a resolution increased by pixel mixture restoration processing from a pixel-mixed image obtained by mixing a plurality of pixels of image pickup signals obtained through image pickup by an image pickup device. When pixel mixture restoration is performed on a pixel-mixed image obtained through nine-pixel mixture, the number of pixels, which has been reduced to one-ninth by pixel mixture, is increased ninefold. In the case of a Bayer image or the like, if each pixel is fully colorized, and the number of pixels is increased threefold, pixel mixture restoration makes the number of pixels 27 times the number of pixels at the time of nine-pixel mixture.

The image processing system enters a pre-image-pickup mode as a result of pressing the shutter button halfway after a shooting situation which can be externally specified is set to one such as a pixel mixture shooting mode via an external I/F section 112. A video signal obtained through shooting via the lens system 100, aperture 101, CFA 102, and CCD 103 is outputted as an analog signal.

Note that the present embodiment contemplates use of a single plate CCD in which a Bayer primary color filter is arranged as the CFA 102 at the front in an image pickup system. FIG. 2 shows a configuration of a Bayer primary color filter. In a Bayer primary color filter, 2×2 pixels are regarded as a base unit, with a red (R) filter and a blue (B) filter each arranged for one pixel and green (Gr, Gb) filters arranged for the other two pixels. Note that although a Bayer primary color filter as shown in FIG. 2 is contemplated as an embodiment of the CFA 102 in the present configuration, the CFA 102 may be configured like a color difference filter shown in FIG. 3, and any color filter may be used as long as the color filter has periodicity. Note that although the green filters are identical to each other, the green filters will be referred to as Gr and Gb to discriminate between the green filters for processing convenience in the present example.

A video signal in the buffer 107 is transferred to the PreWB section 108, a photometric evaluation section 109, and a focused focal point detecting section 110. The PreWB section 108 calculates a simple white balance coefficient by adding up video signals within a predetermined level range for each color signal. The above-described coefficient is transferred to the Gain 105. Simple white balance processing is performed using different gains set for each color signal.

The photometric evaluation section 109 calculates a luminance level in video signals with a set ISO film speed, a shutter speed against a camera shake, and other factors in mind and controls the aperture 101, an electronic shutter speed of the CCD 103, an amplification factor of the Gain 105, and the like such that correct exposure is achieved.

The focused focal point detecting section 110 detects an edge strength in video signals and controls the AF motor 117 to maximize the edge strength, thereby obtaining a focused signal.

Main shooting is performed as a result of fully pressing the shutter button via the external I/F section 112. A video signal is transferred to the buffer 107 in a same manner as in the pre-image-pickup.

At the time, the control section 111 determines a shooting mode. If the shooting mode set in the external I/F section 112 is the pixel mixture shooting mode, an image pickup signal obtained through shooting by the CCD 103 is subjected to pixel mixture processing in the pixel mixture processing section 104 and is transferred to the buffer 107 via the A/D 106. After pixel-mixed image data generated in the pixel mixture processing section 104 is transferred to the buffer 107, the pixel-mixed image data is transferred to the pixel-mixed image restoration processing section 113 serving as the restoration processing section. Note that if the shooting mode is the pixel mixture shooting mode, pixel-mixed image data which has been transferred to the buffer 107 (the data whose pixel number is reduced after the pixel mixture) may also be directly recorded in the pixel mixture recording section 115.

If the shooting mode set in the external I/F section 112 is not the pixel mixture shooting mode, an image pickup signal obtained through shooting by the CCD 103 is transferred to the buffer 107 via the A/D 106 without pixel mixture processing in the pixel mixture processing section 104 and is recorded in the image recording section 115.

After pixel mixture shooting, a shooting situation for a pixel-mixed image is confirmed. The confirmed shooting situation is transferred to the pixel mixture restoration matrix generating section 114 serving as the restoration matrix generating section. A pixel mixture restoration matrix is generated according to the shooting situation. Contents of the pixel mixture restoration matrix are transferred to the pixel-mixed image restoration processing section 113.

A specific example of a shooting situation includes internal parameters, such as a zoom amount, a focus position, and an aperture at the time of shooting of a pixel-mixed image, which are optical-system-related conditions, PSF (Point Spread Function) data which can be calculated from the internal parameters at the time of shooting, a form of a pixel mixture kernel when pixel mixture exemplified in Formula (3) and (4) (to be described later) is performed, and sampling position information at the time of mixture processing of pixel mixture.

Video signals of a pixel-mixed image passed to the pixel-mixed image restoration processing section 113 are subjected to pixel mixture restoration processing.

Before the pixel mixture restoration processing, a pixel mixture restoration matrix used to perform the pixel mixture restoration processing is generated.

A pixel mixture restoration matrix is a matrix obtained by modeling a shooting process for a pixel-mixed image determined by a shooting situation using a matrix representation and calculating a pseudo inverse matrix of the matrix representation of the shooting process.

As an example, a pixel mixture restoration matrix D can be composed as a following matrix:

$$D=T(\tilde{C}_{00}\otimes I_4)Q^+\Phi_p^* \tag{1}$$

where the symbol ~ represents making a frequency domain representation of a matrix below the symbol through a Fourier transform. A matrix T is given as follows.

$$T=(\tilde{K}_{ff}\tilde{H}_c^T\tilde{K}_9^T)\otimes(K_\lambda)\Phi_p \tag{2}$$

The matrix $\tilde{K}_{ff}$ is a result of performing a DFT transform (Discrete Fourier Transform) on a spatial autocorrelation matrix of an original image.

The matrix $\tilde{H}_c^T$ is a result of performing a DFT transform on a PSF filtering matrix and transposing the filtering matrix. A form of the matrix varies depending on a PSF value of a shooting situation.

The matrix $\tilde{K}_9^T$ is a result of performing a DFT transform on a nine-pixel mixture kernel filtering matrix and transposing the filtering matrix. A form of the matrix varies depending on a pixel mixture method. A form of a nine-pixel mixture kernel expressed within the nine-pixel mixture kernel filtering matrix is given by:

$$\begin{bmatrix} 1 & 0 & 1 & 0 & 1 & 0 \\ 0 & 0 & 0 & 0 & 0 & 0 \\ 1 & 0 & 1 & 0 & 1 & 0 \\ 0 & 0 & 0 & 0 & 0 & 0 \\ 1 & 0 & 1 & 0 & 1 & 0 \\ 0 & 0 & 0 & 0 & 0 & 0 \end{bmatrix} \tag{3}$$

when nine-pixel mixture sampling as in FIG. 4 is to be performed.

When four-pixel mixture sampling as in FIG. 5 is to be performed, a form of a four-pixel mixture kernel expressed within a four-pixel mixture kernel filtering matrix is given as follows.

$$\begin{bmatrix} 1 & 0 & 1 & 0 \\ 0 & 0 & 0 & 0 \\ 1 & 0 & 1 & 0 \\ 0 & 0 & 0 & 0 \end{bmatrix} \tag{4}$$

The matrix $K_\lambda$ is a color autocorrelation matrix of the original image and is a 4×4 matrix with elements, each of which is a value of correlation between colors in the original image.

The matrix Φ is a phase matrix for describing a phase between colors in pixel mixture sampling and is a matrix which is a representation of a result of performing a DFT transform on a spatial phase between color data sampled at the time of pixel mixture. A form of the matrix Φ varies depending on a pixel mixture method. The matrix $\Phi_p$ is a result of performing permutation conversion on the matrix Φ.

The matrix $\Phi_p$ is represented by:

$$\Phi_p=P^T\Phi P \tag{5}$$

using a permutation conversion matrix $P^T$ and an inverse permutation conversion matrix P. The matrix $\Phi_p$ represents a sampling spatial phase between colors shown in FIG. 4 or FIG. 5 depending on whether the matrix $\Phi_p$ is intended for nine-pixel mixture sampling or four-pixel mixture sampling. A form of the matrix $\Phi_p$ thus varies depending on a pixel mixture method.

The matrix $Q^+$ can be represented as follows.

$$Q^+=[(\tilde{C}_{00}\otimes I_4)E(\tilde{C}_{00}\otimes I_4)]^+ \tag{6}$$

Note that E is a block diagonal matrix composed of 4×4 matrices and is given as follows.

$$E=\Phi_p^*(\tilde{K}_9\tilde{H}_c\tilde{K}_{ff}\tilde{H}_c^T\tilde{K}_9^T)\otimes(K_\lambda)\Phi_p \tag{7}$$

The matrix $\tilde{C}_{00}$ is given by:

$$\tilde{C}_{00}=W_{N^2\times N^2}(\mathrm{diag}(1,0,0,0,0,0,\ldots,1,0,0,0,0,0)\otimes\mathrm{diag}(1,0,0,0,0,0,\ldots,1,0,0,0,0,0))W_{N^2\times N^2}^{-1} \tag{8}$$

when nine-pixel mixture sampling as in FIG. 4 is to be performed and is given by:

$$\tilde{C}_{00}=W_{N^2\times N^2}(\mathrm{diag}(1,0,0,0,\ldots,1,0,0,0)\otimes\mathrm{diag}(1,0,0,0,\ldots,1,0,0,0))W_{N^2\times N^2}^{-1} \tag{9}$$

when four-pixel mixture sampling as in FIG. 5 is to be performed. A form of the matrix $\tilde{C}_{00}$ varies depending on a pixel-mixed image sampling method. diag( . . . ) represents a block diagonal matrix with elements on a main diagonal.

A method for generating the above-described pixel mixture restoration matrix D will be described below.

Since a pixel mixture restoration matrix is obtained by modeling, as a matrix, a shooting process for a pixel-mixed image determined by a shooting situation and calculating a pseudo inverse matrix of the matrix, a shooting situation needs to be acquired in advance to obtain the pixel mixture restoration matrix D.

A shooting situation acquiring section will be described.

In a shooting situation, a zoom amount, a focus position, and the like are acquired from an in-focus position detection value in the focused focal point detecting section 110 in FIG. 1. A value of an aperture or the like is acquired from a value of an f number in the photometric evaluation section 109. The pixel mixture restoration matrix generating section 114 has a mechanism for calculating a PSF from internal parameters such as a zoom amount, a focus position, and an aperture when the internal parameters are supplied. The pixel mixture restoration matrix generating section 114 includes a PSF data generating section 114*a* capable of uniquely determining PSF data from a combination of values of internal parameters such as a zoom amount, a focus position, and an aperture by reference to a LUT (Look Up Table) if, for example, the internal parameters are set.

In a shooting situation, pieces of information such as a form of a pixel mixture kernel for pixel mixture and a pixel mixture sampling method are determined by the pixel mixture shooting mode (e.g., nine-pixel mixture or four-pixel mixture) specified via the external I/F section 112.

A noise-amount-related shooting situation such as a result of modeling, as a shooting process, the amount of noise included in an image is also conceivable. In the case, the amount of noise generated is modeled within the pixel mixture restoration matrix using a predetermined ISO film speed with a gain width in the Gain 105 and the like in mind.

The pixel mixture restoration matrix generating section will be described.

The pixel mixture restoration matrix is composed and generated using the above-described pieces of information acquired as a shooting situation. More specifically, pieces of elemental data of the pixel mixture restoration matrix are composed using pieces of data (basic data) of the matrix $\tilde{H}_c^T$, the matrix $\tilde{K}_9^T$, the matrix $\tilde{K}_9$, the matrix $\Phi_p$, the matrix $\tilde{C}_{00}$, the matrix $\tilde{K}_{ff}$, and the matrix $K_\lambda$, which are matrices constituting the pieces of elemental data of the pixel mixture restoration matrix, thereby generating the pixel mixture restoration matrix.

The matrix $\tilde{H}_c^T$ is composed using PSF data of the shooting situation.

The matrix $\tilde{K}_9^T$ matrix $\tilde{K}_9$ are composed from a form of a pixel mixture kernel of the shooting situation.

The matrix $\Phi_p$ and matrix $\tilde{C}_{00}$ are composed from a pixel mixture sampling method of the shooting situation.

The matrix $\tilde{K}_{ff}$ and matrix $K_\lambda$ are each a piece of information on autocorrelation of an original image, and a form of each matrix is not uniquely determined at the time of shooting. Several matrices describing a characteristic of the image are held as candidates for each of the matrix $\tilde{K}_{ff}$ and matrix $K_\lambda$ in a storage region 114*b* of the pixel mixture restoration matrix generating section 114, on the basis of prior information on shot images. Any one of the candidates is selected and used.

The matrices (pieces of basic data) constituting the pixel mixture restoration matrix D are obtained from pieces of information of the shooting situation as described above, and the pixel mixture restoration matrix D is generated from the obtained matrices (the pieces of basic data). In the present embodiment, a plurality of pieces of basic data (matrices) are stored in advance in the storage region 114*b* in the pixel mixture restoration matrix generating section 114 for each of shooting situations, and pieces of basic data corresponding to a specific shooting situation are used in combination. With the operation, the pixel mixture restoration matrix D is generated. Note that the present embodiment may be configured to generate the pixel mixture restoration matrix D by holding a plurality of pixel mixture restoration matrices D for respective shooting situations in the storage region 114*b* and selecting one of the pixel mixture restoration matrices D corresponding to one of the shooting situations, instead of storing, in advance, pieces of basic data (matrices) for each of shooting situations in the storage region 114*b*.

In the case, each pixel mixture restoration matrix D may also be stored in the storage region 114*b* after moving redundant elemental data. Redundancy in the pixel mixture restoration matrix D will be described later.

The pixel mixture restoration matrix D generated by the pixel mixture restoration matrix generating section 114 is used for pixel mixture restoration processing in the pixel-mixed image restoration processing section 113.

A procedure for pixel mixture reconstruction processing in the pixel-mixed image restoration processing section 113 serving as a section for restoring a pixel-mixed image transmitted from the buffer 107 or an image recording section 115 is described below.

FIG. 6 is a block diagram showing a processing flow of the pixel-mixed image restoration processing section 113 in FIG. 1. A description will be given below in the context of nine-pixel mixture processing shown in FIG. 4.

A pixel-mixed image which has undergone pixel mixture processing in the pixel mixture processing section 104 serving as the pixel mixture section connected to the CCD 103 is transmitted to the pixel-mixed image restoration processing section 113 and is converted into a column vector in an image-to-column vector conversion processing section 201. The image-to-column vector conversion processing section 201 performs a process of sequentially placing columns of data of the image in a line on a column vector from a left side of the image.

FIG. 7 shows a processing conceptual diagram of image-to-column vector conversion processing in the image-to-column vector conversion processing section 201, which performs conversion into a one-dimensional data string. A blank region in FIG. 7 represents a zero component and, in other words, indicates that the region is a region which is unrelated to an operation (for which no operation is performed). If an image is transmitted as one-dimensional data at the time of image transmission, the processing can be omitted by regarding the one-dimensional data as column vector data.

The image data which has undergone the column vector conversion in the image-to-column vector conversion processing section 201 is subjected to a two-dimensional DFT operation in a two-dimensional DFT processing section 202 serving as a frequency conversion section. The DFT (Discrete Fourier Transform) operation in the two-dimensional DFT processing section 202 is performed by multiplying the image which has undergone the column vector conversion in the image-to-column vector conversion processing section 201 by a matrix as given by Formula (10) below. $W_2$ refers to a matrix for performing a two-dimensional DFT. In the matrix, N represents both a vertical size and a horizontal size of an original image, and $W_{N^2 \times N^2}$ is a DFT matrix for performing a DFT operation on an N×N image. Note that a blank region in Formula (10) represents a zero component. As the DFT operation, a process of performing a FFT (Fast Fourier Transform) operation on the image column vector from the image-to-column vector conversion processing section 201 may be performed instead of multiplication by a DFT matrix.

$$W_2 = \begin{bmatrix} W_{N^2\times N^2} & & & \\ & W_{N^2\times N^2} & & \\ & & W_{N^2\times N^2} & \\ & & & W_{N^2\times N^2} \end{bmatrix} \tag{10}$$

Since the matrix with the above-described composition is a diagonal matrix, elements are sparse, and a high-speed operation can be performed.

Note that although a DFT operation has been described as an embodiment in the present embodiment, the present invention is not limited to a DFT operation. Any matrix operation may be applied to the present configuration as long as the matrix operation is an orthogonal matrix operation or unitary matrix operation which has a diagonalization effect on a real symmetric matrix or an Hermitian matrix.

The column vector image data which has undergone the two-dimensional DFT operation in the two-dimensional DFT processing section 202 is subjected to data replacement in a permutation conversion processing section 203 serving as a permutation conversion section. More specifically, a product of the permutation conversion matrix $P^T$ and the column vector data is calculated. The permutation conversion matrix $P^T$ and inverse permutation conversion matrix P are each a matrix for replacement, which interchanges right and left elements of a Kronecker product of a 4×4 matrix and a $N^2 \times N^2$ matrix. Since the permutation conversion processing section 203 does not actually perform a data operation but performs a process of rearranging pieces of data, change of order of operations at the time of operations in the pixel mixture restoration matrix data operation section 204 makes it possible to omit processing in the permutation conversion processing section 203.

The column vector image data which has undergone the data permutation conversion processing in the permutation conversion processing section 203 is subjected to pixel mixture restoration processing in the pixel mixture restoration matrix data operation section 204 serving as a restoration operation section. The pixel mixture restoration matrix data operation section 204 performs a matrix operation using the pixel mixture restoration matrix D generated in the pixel mixture restoration matrix generating section 114 in FIG. 1 and the column vector image data which has undergone the data permutation conversion processing in the permutation conversion processing section 203, thereby performing the restoration processing.

Pixel mixture-restored data may be generated by simply performing, as a matrix operation, a multiplication of the pixel mixture restoration matrix D and the column vector image data. In the present embodiment, however, a matrix operation is performed at high speed using redundancy between a structure of the pixel mixture restoration matrix D and a data structure of the column vector image data. Note that the pixel mixture restoration matrix D is given by Formula (1) described above.

An operation method which achieves speedup with a focus on redundancy will be described below.

A result of performing operations in the two-dimensional DFT processing section 202, the permutation conversion processing section 203, and the pixel mixture restoration matrix data operation section 204 on image data y which has undergone column vector conversion in the image-to-column vector conversion processing section 201 is represented as follows.

$$T(\tilde{C}_{00} \otimes I_4)Q^+\Phi_p{}^*P^T W_2 y \tag{11}$$

Redundancy of Formula (11) will be described.

First, redundancy of data in Formula (11) will be discussed.

Letting $y_1$ be image data which is a result of processing from a right end to the phase matrix $\Phi_p{}^*$ of Formula (11), a following formula:

$$y_1 = \Phi_p{}^* P^T W_2 y \tag{12}$$

holds. A structure of the image data $y_1$ can be transformed as follows.

$$\begin{aligned} y_1 &= \Phi_p^* P^T W_2 y \\ &= \Phi_p^* P^T W_2 C H_9 H_{fc} x \\ &= P^T \Phi^* W_2 C W_2^{-1} \Phi \Phi^* W_2 H_9 H_{fc} x \\ &= P^T (I_4 \otimes \tilde{C}_{00}) \Phi^* W_2 H_9 H_{fc} x \\ &= P^T (I_4 \otimes \tilde{C}_{00}) P P^T \Phi^* P P^T W_2 H_9 H_{fc} x \\ &= (\tilde{C}_{00} \otimes I_4) \Phi_p^* P^T W_2 H_9 H_{fc} x \\ &= (\tilde{C}_{00} \otimes I_4) y' \\ &= (\tilde{C}_{00} \otimes I_4) \Phi_p^* P^T W_2 y \end{aligned} \tag{13}$$

In the transform, a following formula:

$$(\tilde{C}_{00} \otimes I_4) = (\tilde{C}_{00} \otimes I_4)(\tilde{C}_{00} \otimes I_4) \tag{14}$$

is used.

The fact that a shooting process of obtaining the pixel-mixed image data y from an original image x by shooting can be modeled as follows:

$$y = C H_9 H_{fc} x \tag{15}$$

is also used. In Formula (15), following formulae hold.

$$H_{fc} = \begin{bmatrix} H_c & & & \\ & H_c & & \\ & & H_c & \\ & & & H_c \end{bmatrix} \tag{16}$$

$$H_9 = \begin{bmatrix} K_9 & & & \\ & K_9 & & \\ & & K_9 & \\ & & & K_9 \end{bmatrix} \tag{17}$$

$$C = \begin{bmatrix} C_{00} & & & \\ & C_{03} & & \\ & & C_{30} & \\ & & & C_{33} \end{bmatrix} \tag{18}$$

In Formula (18), following formulae hold.

$$C^{kl} = C^k \otimes C^l \tag{19}$$

$$C^0 = \mathrm{diag}(1,0,0,0,0,0, \ldots ,1,0,0,0,0,0) \tag{20}$$

$$C^3 = \mathrm{diag}(0,0,0,1,0,0, \ldots ,0,0,0,1,0,0) \tag{21}$$

As can be seen from Formula (13), as for the image data $y_1$, at a row index:

$$y_1\left[4\left(N\left(\frac{N}{6}m+i\right)+\frac{N}{6}n+j\right)+k\right] \tag{22}$$

where $$i=0,1,2,3,\ldots,\frac{N}{6}$$
$$j=0,1,2,3,\ldots,\frac{N}{6}\quad (m,n)=\begin{cases}m=0,1,2,3,4,5\\ n=0,1,2,3,4,5\end{cases}$$
$$k=0,1,2,3$$

data at an index position is same for each of 36 possible combinations of (m,n), and the image data $y_1$ has redundancy. Since the redundancy can be determined according to $\tilde{C}_{00}\otimes I_4$ representing a sampling style in Formula (13) described above, the redundancy can be determined from a pixel mixture sampling style. Elimination of sameness (=redundancy) among the pieces of data at the 36 index positions makes it possible to save a data storage space required to hold data.

The matrix T is a block diagonal matrix with diagonally arranged $N^2$ 4×4 matrices. As for $T(\tilde{C}_{00}\otimes I_4)$, at a column index:

$$T(\tilde{C}_{00}\otimes I_4)\left[\cdot,\,4\left(N\left(\frac{N}{6}m_2+i\right)+\frac{N}{6}n_2+j\right)+k\right] \tag{23}$$

where $$i=0,1,2,3,\ldots,\frac{N}{6}$$
$$j=0,1,2,3,\ldots,\frac{N}{6}\quad (m,n)=\begin{cases}m_2=0,1,2,3,4,5\\ n_2=0,1,2,3,4,5\end{cases}$$
$$k=0,1,2,3$$

indices for $6^2$ (=36) possible combinations of $(m_2,n_2)$ are same, and $T(\tilde{C}_{00}\otimes I_4)$ has redundancy. In Formula (23), • in a row index indicates that the row index is an arbitrary row index.

Since the redundancy can be determined according to $\tilde{C}_{00}\otimes I_4$ representing a sampling style in $T(\tilde{C}_{00}\otimes I_4)$ in Formula (23) described above, the redundancy can be determined from a pixel mixture sampling style. Elimination of sameness (=redundancy) among pieces of data at the 36 index positions makes it possible to save a memory space required to hold elemental data of a pixel mixture restoration matrix in the pixel mixture restoration matrix generating section 114.

As for the matrix $Q^+$, at a index:

$$Q^+\begin{pmatrix}\left[4\left(N\left(\frac{N}{6}m_1+i\right)+\frac{N}{6}n_1+j\right)+k\right],\\ \left[4\left(N\left(\frac{N}{6}m_2+i\right)+\frac{N}{6}n_2+j\right)+k\right]\end{pmatrix} \tag{24}$$

where

-continued $$i=0,1,2,3,\ldots,\frac{N}{6}$$
$$j=0,1,2,3,\ldots,\frac{N}{6}\quad (m_1,m_2,n_1,n_2)=\begin{cases}m_1=0,1,2,3,4,5\\ m_2=0,1,2,3,4,5\\ n_1=0,1,2,3,4,5\\ n_2=0,1,2,3,4,5\end{cases}$$
$$k=0,1,2,3$$

pieces of data for $6^4$ (=1,296; 36×36) possible combinations of $(m_1,m_2,n_1,n_2)$ are same, and the matrix $Q^+$ has redundancy.

Since the redundancy can be determined according to $\tilde{C}_{00}\otimes I_4$ representing a sampling style in $Q^+$ in Formula (24) described above, the redundancy can be determined from a pixel mixture sampling style. Elimination of sameness (=redundancy) among the pieces of data at the 1,296 index positions makes it possible to save a memory space required to hold elemental data of a pixel mixture restoration matrix in the pixel mixture restoration matrix generating section 114.

Redundancy in the operation (product-sum operation) in Formula (11) will be discussed on the basis of the above-described data redundancies.

As for the product of $Q^+$ and $y_1$, $Q^+\times y_1$, if a row index for $y_1$ is given by:

$$y_1\left[4\left(N\left(\frac{N}{6}m+i\right)+\frac{N}{6}n+j\right)+k\right] \tag{25}$$

where $$i=0,1,2,3,\ldots,\frac{N}{6}$$
$$j=0,1,2,3,\ldots,\frac{N}{6}\quad (m,n)=\begin{cases}m=0,1,2,3,4,5\\ n=0,1,2,3,4,5\end{cases}$$
$$k=0,1,2,3$$

there is redundancy among 36 possible combinations of (m,n).

If an index for Q+ is given by:

$$\begin{pmatrix}\left[4\left(N\left(\frac{N}{6}m_1+i\right)+\frac{N}{6}n_1+j\right)+k\right],\\ \left[4\left(N\left(\frac{N}{6}m_2+i\right)+\frac{N}{6}n_2+j\right)+k\right]\end{pmatrix} \tag{26}$$

where $$i=0,1,2,3,\ldots,\frac{N}{6}$$
$$j=0,1,2,3,\ldots,\frac{N}{6}\quad (m_1,m_2,n_1,n_2)=\begin{cases}m_1=0,1,2,3,4,5\\ m_2=0,1,2,3,4,5\\ n_1=0,1,2,3,4,5\\ n_2=0,1,2,3,4,5\end{cases}$$
$$k=0,1,2,3$$

there is redundancy among $6^4$ (=1,296) possible combinations of $(m_1,m_2,n_1,n_2)$. Accordingly, as for the product of $Q^+$ and $y_1$, $Q^+\times y_1$, $6^4$ (=1,296) possible operations are redundant in a product-sum operation.

Assume that $y_2=Q^+y_1$. In the case, data $y_2$ has same redundancy as $y_1$. Because of the fact that an index for $y_2$ has same redundancy as $y_1$ and that if an index for $T(\tilde{C}_{00}\otimes I_4)$ is given by:

$$T(\tilde{C}_{00}\otimes I_4)\left[\cdot, 4\left(N\left(\frac{N}{6}m_2+i\right)+\frac{N}{6}n_2+j\right)+k\right] \tag{27}$$

where $$i=0,1,2,3,\ldots,\frac{N}{6}$$

$$j=0,1,2,3,\ldots,\frac{N}{6}\quad (m_2,n_2)=\begin{cases} m_2=0,1,2,3,4,5\\ n_2=0,1,2,3,4,5\end{cases}$$

$$k=0,1,2,3$$

data at a single row is redundant among $6^2$ (=36) possible combinations of $(m_2,n_2)$, and 36 pieces of data are present for the single row, 36 possible operations are redundant in a product-sum operation on a product of $T(\tilde{C}_{00}\otimes I_4)$ and $y_2$, $T(\tilde{C}_{00}\otimes I_4)\times y_2$.

With the above-described operations, calculation amount of operations in the matrix operation for $Q^+$ and $y_1$ is reduced to one-1,296th. Calculation amount of operations in the matrix operation for $T(\tilde{C}_{00}\otimes I_4)$ and $y_2$ is reduced to one-36th.

A column vector of pixel mixture-restored image data obtained in the above-described manner is subjected to inverse permutation conversion in an inverse permutation conversion processing section 205 by being multiplied by the inverse permutation conversion matrix. The inverse permutation conversion matrix will be denoted by P if the permutation conversion matrix used in the permutation conversion processing section 203 is denoted by $P^T$.

The pixel mixture-restored image data which has undergone the inverse permutation conversion processing in the inverse permutation conversion processing section 205 is subjected to two-dimensional IDFT processing using an IDFT matrix in a two-dimensional IDFT processing section 206. Although an IDFT operation can be performed by multiplying the column vector of the pixel mixture-restored image data by the IDFT matrix, similar processing may be performed in a FFT operation. The IDFT matrix is an inverse matrix of the DFT matrix $W_2$ described above and is denoted by $W_2^{-1}$. IDFT processing has been described as an embodiment in the present embodiment. If the frequency conversion section adapted to the two-dimensional DFT processing section 202 described above is an orthogonal matrix operation or unitary matrix operation which has a diagonalization effect on a real symmetric matrix or an Hermitian matrix, the processing may be performed by any operation method as long as an operation defining an inverse matrix of the orthogonal matrix or unitary matrix is used.

From the above description, a pixel mixture restoration processing matrix Dpm in a part denoted by reference numerals 202 to 206 in FIG. 6 can be represented as follows.

$$Dpm=W_2^{-1}P\ T(\tilde{C}_{00}\otimes I_4)Q^+\Phi_p{}^*P^TW_2 \tag{28}$$

By calculating a product of the pixel mixture restoration processing matrix Dpm and the pixel-mixed image y which has undergone the column vector conversion in the image-to-column vector conversion processing section 201, a pixel mixture-restored image f which is a fully colorized column vector can be obtained.

$$f=Dpm\cdot y \tag{29}$$

Column vector data of the pixel mixture-restored image data which has undergone the two-dimensional IDFT processing in the two-dimensional IDFT processing section 206 is converted into an image in a column vector-to-image conversion processing section 207 and is outputted as two-dimensional data.

In the above-described manner, the pixel-mixed image data which has undergone the pixel mixture processing in the pixel mixture processing section 104 of the CCD 103 in FIG. 1 is subjected to the pixel mixture restoration processing in the pixel-mixed image restoration processing section 113.

A pixel mixture-restored image which has undergone the pixel mixture restoration processing in the pixel-mixed image restoration processing section 113 is outputted from the pixel-mixed image restoration processing section 113 and is transmitted to the output section 116 or the image recording section 115. Data of the pixel mixture-restored image outputted from the output section 116 is used as resources for image display by, e.g., a CRT, liquid crystal, or organic EL display, image transmission using various transmission section such as USB, IEEE1394, and TCP/IP, and media recording on various recording media such as a CompactFlash (registered trademark), xD-Picture Card (registered trademark), and DVDR.

According to the first embodiment of the present invention, it is possible to provide an image processing system capable of performing pixel mixture restoration processing at high speed with high precision, not using a repetitive operation but using a matrix operation for restoration processing, when restoring a resolution of a pixel-mixed image obtained by mixing a plurality of pixels on an image pickup device.

Second Embodiment

Figure 8:
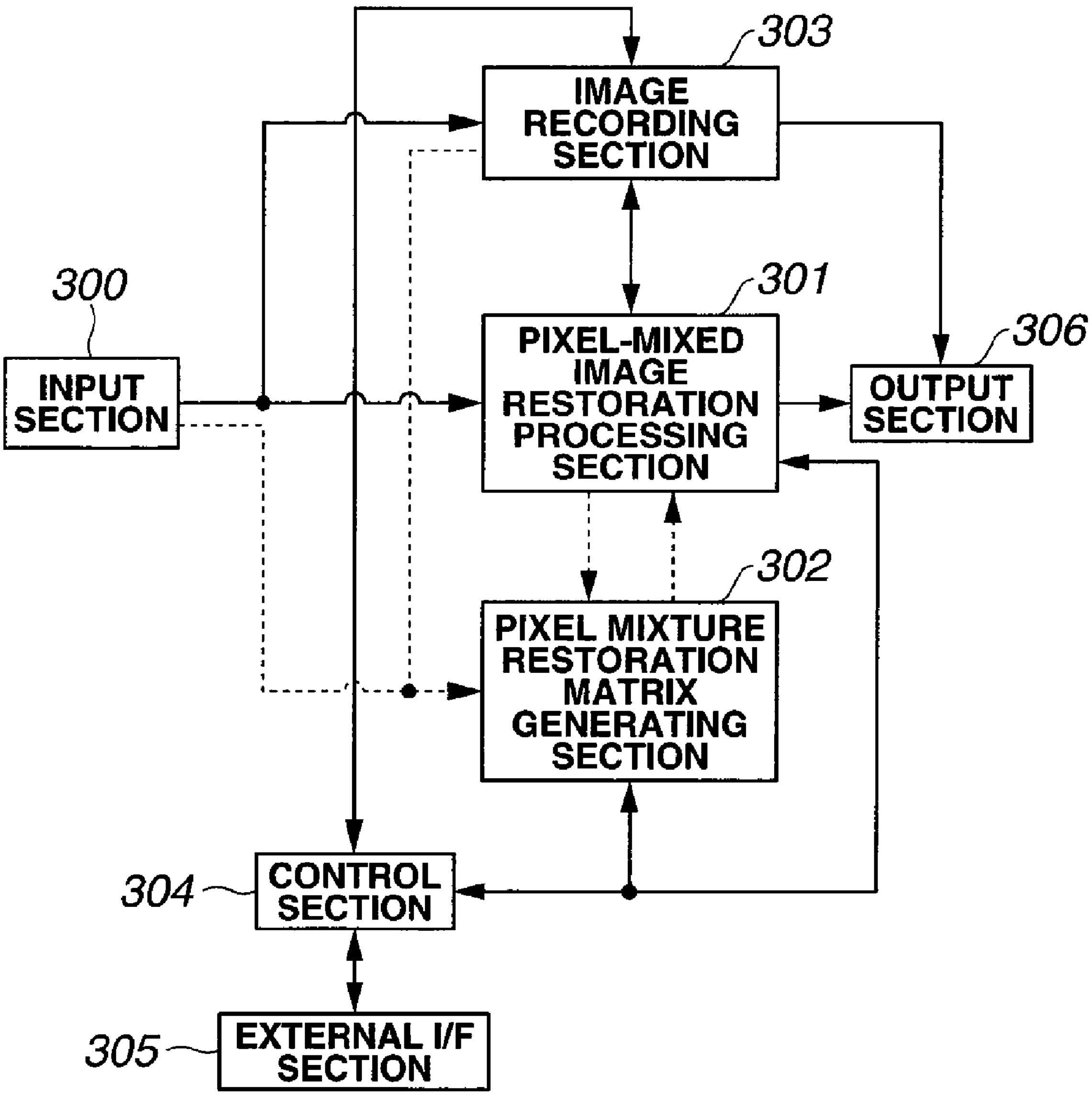
FIG. 8 is a configuration diagram of an image processing system according to a second embodiment of the present invention.

FIGS. 2 to 8 relate to an image processing system according to a second embodiment of the present invention. FIG. 2 is a diagram showing a configuration of a Bayer primary color filter. FIG. 3 is a diagram showing a color difference filter. FIG. 4 is a conceptual diagram of nine-pixel mixture processing. FIG. 5 is a conceptual diagram of four-pixel mixture processing. FIG. 6 is a block diagram showing a configuration of a pixel-mixed image restoration processing section in FIG. 1. FIG. 7 is a conceptual diagram of image-to-column vector conversion processing. FIG. 8 is a configuration diagram of an image processing system according to the second embodiment of the present invention. FIGS. 2 to 7 also relate to the first embodiment, and a description with reference to FIGS. 2 to 7 will be omitted. A description will be given with a main focus on FIG. 8.

In an image processing system shown in FIG. 8, an input section 300 is connected to an image recording section 303 and a pixel-mixed image restoration processing section 301. The pixel-mixed image restoration processing section 301 is bi-directionally connected to the image recording section 303 and is connected to an output section 306. The image recording section 303 is connected to the output section 306, in addition to the above-described connection destination. The input section 300 is connected to a pixel mixture restoration matrix generating section 302.

The pixel mixture restoration matrix generating section 302 is connected to the pixel-mixed image restoration processing section 301. An external I/F section 305 is bi-directionally connected to a control section 304. The control section 304 is bi-directionally connected to the pixel-mixed image restoration processing section 301, pixel mixture restoration matrix generating section 302, and image recording section 303, in addition to the external I/F section 305.

Functions and operation of the sections in FIG. 8 will be described below.

Video signals inputted via the input section 300 are transferred to the image recording section 303 or pixel-mixed image restoration processing section 301. The video signals inputted via the input section 300 are digital video signals which are obtained by A/D conversion after an image is picked up by a CCD via a CFA in FIG. 2 or FIG. 3, is photoelectrically converted, and is subjected to, e.g., nine-pixel mixture or four-pixel mixture in a pixel mixture processing section serving as a pixel mixture section. Information indicating whether the input image is a pixel-mixed image and shooting situation-related information are added to the video signals as additional information. Note that the shooting situation-related information for the input image includes optical system-related parameters such as a zoom amount, a focus amount, and an aperture at the time of CCD image pickup.

When the input image is inputted as the video signals from the input section 300, a determination as to whether the input image is a pixel-mixed image is made. If the input image is a pixel-mixed image, the video signals are transferred to the pixel-mixed image restoration processing section 301. On the other hand, if the input image is not a pixel-mixed image, the video signals are transferred to the image recording section 303.

Note that the present embodiment includes a mode of transferring a pixel-mixed image to the image recording section 303 instead of transferring the pixel-mixed image to the pixel-mixed image restoration processing section 301 to reduce a recording space in the image recording section 303 even if the pixel-mixed image is inputted. In the case, the present embodiment includes a mode of appropriately transferring the image recorded on the image recording section 303, i.e., the pixel-mixed image from the image recording section 303 to the pixel-mixed image restoration processing section 301 by a user's specification via an external I/F section and transferring a shooting situation for the pixel-mixed image to the pixel mixture restoration matrix generating section 302.

The input section 300 makes the determination as to whether an input to the input section 300 is a pixel-mixed input, on the basis of additional information included in a pixel-mixed image. If the image inputted via the input section 300 is a pixel-mixed image, video signals of the input image are transferred to the pixel-mixed image restoration processing section 301, and a shooting situation included as additional information in the pixel-mixed image is transferred to the pixel mixture restoration matrix generating section 302.

A method for adding a shooting situation for an image as header information of the image or the like is used as an additional information description method.

The pixel mixture restoration matrix generating section 302 generates a pixel mixture restoration matrix on the basis of the shooting situation for the pixel-mixed image transferred to the pixel mixture restoration matrix generating section 302.

Embodiments of the type of a shooting situation added as additional information to a pixel-mixed image and a procedure for generating a pixel mixture restoration matrix from the shooting situation are the same as embodiments in the method according to the first embodiment.

An embodiment of a method for recording a pixel mixture restoration matrix in the pixel mixture restoration matrix generating section 302 is the same as an embodiment in the method according to the first embodiment.

The pixel mixture restoration matrix generated in the pixel mixture restoration matrix generating section 302 is transferred to the pixel-mixed image restoration processing section 301.

The pixel-mixed image restoration processing section 301 performs a matrix operation using the pixel-mixed image and pixel mixture restoration matrix transferred to the pixel-mixed image restoration processing section 301 and generates a pixel mixture-restored image. An embodiment of a matrix operation method for generating a pixel mixture-restored image is the same as an embodiment in the method according to the first embodiment.

The pixel mixture-restored image generated in the pixel-mixed image restoration processing section 301 is transferred to the image recording section 303 or output section 306.

Data of the pixel mixture-restored image outputted from the output section 306 is used as resources for image display by, e.g., a CRT, liquid crystal, or organic EL display, image transmission using various transmission section such as USB, IEEE1394, and TCP/IP, and media recording on various recording media such as a CompactFlash (registered trademark), xD-Picture Card (registered trademark), and DVDR. Note that an image recorded in the image recording section 303 is also outputted from the output section 306 and utilized in the above-described manner.

According to the second embodiment of the present invention, it is possible to provide an image processing system capable of performing pixel mixture restoration processing at high speed with high precision, not using a repetitive operation but using a matrix operation for restoration processing, when restoring a resolution of a pixel-mixed image obtained by mixing a plurality of pixels on an image pickup device.

The present invention can be widely applied to an image pickup apparatus such as a digital camera including a multi-pixel image pickup device and an image processing apparatus which processes image data obtained by an image pickup apparatus.

The present invention is not limited to the above-described embodiments, and various changes, modifications, and the like may be made without departing from spirit and scope of the present invention.

What is claimed is:

1. An image processing system for restoring a resolution of a pixel-mixed image represented by a mixed-pixel signal which is acquired when a plurality of pixel signals in an image pickup device are mixed and are read out, comprising:

a shooting situation acquiring section for acquiring a shooting situation when the mixed-pixel signal is acquired;

a restoration matrix generating section for generating a pixel mixture restoration matrix based on the shooting situation acquired by the shooting situation acquiring section; and a restoration processing section for restoring the resolution of the pixel-mixed image using the mixed-pixel signal and the pixel mixture restoration matrix.

2. The image processing system according to claim 1, further comprising:

an image pickup section for generating a plurality of pixel signals by shooting a subject; and a pixel mixture section for mixing and reading out the plurality of pixel signals obtained by the image pickup section, wherein the shooting situation acquiring section acquires, as the shooting situation, at least one of a situation when the subject is shot by the image pickup section and a situation when the plurality of pixel signals are mixed and are read out by the pixel mixture section.

3. The image processing system according to claim 1, wherein the shooting situation acquiring section acquires, as the shooting situation, a condition concerning a shooting optical system when the subject is shot.

4. The image processing system according to claim 1, wherein the shooting situation acquiring section comprises a PSF data generating section for generating PSF data from a condition concerning a shooting optical system when the subject is shot and acquires the PSF data as the shooting situation.

5. The image processing system according to claim 4, wherein the PSF data generating section generates the PSF data by searching a LUT under the condition concerning the shooting optical system.

6. The image processing system according to claim 1, wherein the shooting situation acquiring section acquires, as the shooting situation, information on a pixel mixture style when the plurality of pixel signals in the image pickup device are mixed and are read out.

7. The image processing system according to claim 1, wherein additional information indicating the shooting situation is added to the mixed-pixel signal, and the shooting situation acquiring section acquires the shooting situation from the additional information.

8. The image processing system according to claim 1, comprising a storage region in which elemental data of the pixel mixture restoration matrix is held in advance.

9. The image processing system according to claim 1, comprising a storage region in which elemental data of the pixel mixture restoration matrix is held in advance according to the shooting situation, wherein the restoration matrix generating section generates the pixel mixture restoration matrix having the elemental data corresponding to the shooting situation acquired by the shooting situation acquiring section.

10. The image processing system according to claim 1, comprising a storage region in which basic data for composing elemental data of the pixel mixture restoration matrix is held in advance according to the shooting situation, wherein the restoration matrix generating section generates the pixel mixture restoration matrix by composing the elemental data using the basic data corresponding to the shooting situation acquired by the shooting situation acquiring section.

11. The image processing system according to claim 1, wherein the restoration processing section comprises:

a frequency conversion section for performing frequency conversion on the pixel-mixed image;

a permutation conversion section for interchanging arbitrary elements of the pixel-mixed image after frequency conversion; and a restoration operation section for performing a restoration operation on the pixel-mixed image using the pixel mixture restoration matrix generated by the restoration matrix generating section.

12. The image processing system according to claim 11, wherein the frequency conversion section performs an orthogonal matrix operation or a unitary matrix operation which has a diagonalization effect on a real symmetric matrix or an Hermitian matrix.

13. The image processing system according to claim 11, wherein the frequency conversion section performs a FFT operation.

14. The image processing system according to claim 11, wherein the restoration operation section determines redundancy of pieces of elemental data of the pixel mixture restoration matrix, unifies ones of the pieces of elemental data which have been determined to be redundant into one piece of elemental data, and performs the restoration operation on the one piece of elemental data.

15. The image processing system according to claim 1, comprising a pixel mixture recording section in which the pixel-mixed image is recorded and held.

* * * * *